United States Patent
Wu

(10) Patent No.: US 8,284,038 B2
(45) Date of Patent: Oct. 9, 2012

(54) SYSTEM AND METHOD FOR INDICATING A VEHICLE DRIVING MODE

(75) Inventor: Hongjie Wu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 450 days.

(21) Appl. No.: 12/539,113

(22) Filed: Aug. 11, 2009

(65) Prior Publication Data

US 2011/0037582 A1 Feb. 17, 2011

(51) Int. Cl.
*B60Q 1/00* (2006.01)
*G09G 5/00* (2006.01)

(52) U.S. Cl. ............ 340/438; 340/439; 340/450.2; 340/461; 345/662; 345/667

(58) Field of Classification Search ............ 340/438, 340/439, 450.2, 461; 345/662, 667
See application file for complete search history.

(56) References Cited

U.S. PATENT DOCUMENTS

| 7,091,839 | B2 | 8/2006 | Situ et al. |
| 2003/0155810 | A1* | 8/2003 | Mizuta et al. ............ 307/10.1 |
| 2003/0160686 | A1* | 8/2003 | Uno ............................ 340/432 |
| 2005/0128065 | A1* | 6/2005 | Kolpasky et al. ........... 340/461 |
| 2007/0208468 | A1 | 9/2007 | Sankaran et al. |

OTHER PUBLICATIONS http://www.canadiandriver.com/testd . . . , Canadian Driver, Test Drive: 2007 Nissan Altima Hybrid, Aug. 24, 2007, pp. 1-9.
https://priuschat.com/forums/prius-m . . . , EV Mode Indicator on 07 Instrument Cluster, Feb. 4, 2007, pp. 1-5.

* cited by examiner

*Primary Examiner* — Daniel Wu
*Assistant Examiner* — Mancil Littlejohn
(74) *Attorney, Agent, or Firm* — Jennifer M. Stec; Brooks Kushman P.C.

(57) ABSTRACT

A display system for a vehicle is provided. The display system includes an information display that changes color based upon an operating state of a vehicle. The information display includes display lighting that illuminates at least a portion of the display in a color associated with the vehicle's current operating state to indicate the operating state to a driver.

20 Claims, 3 Drawing Sheets

SYSTEM AND METHOD FOR INDICATING A VEHICLE DRIVING MODE

TECHNICAL FIELD

The present application relates to a system and method for indicating the driving mode of a vehicle. A detailed description and accompanying drawings are set forth below.

DETAILED DESCRIPTION

Vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help operators to better learn the operation of these vehicles that utilize new technology. For example, many HEVs incorporate gauges that attempt to provide the operator with information on the various hybrid driving states. These gauges indicate to the operator when the vehicle is being propelled by the engine alone, the motor alone, or a combination of the two. Similarly, a display may indicate when the motor is operating as a generator, and is recharging an energy storage device, such as a battery.

With regard to HEVs, it is known that some drivers may not be able to achieve desired fuel economy numbers, in part because of driving habits. In many cases, drivers are willing to modify their behavior, but are unable to translate recommended techniques into real changes in their driving habits. With the advent of sensing electronics, computers and other vehicle related technology, the amount of vehicle information that can be communicated to the driver is virtually limitless. Often, the driver may not even know of all the features and capabilities their vehicles have to offer. Although displaying certain types of information can help facilitate economical driving choices, particularly information relevant to HEVs, this increase in information relayed to a driver may become confusing, overwhelming or even distracting.

Figure 1:
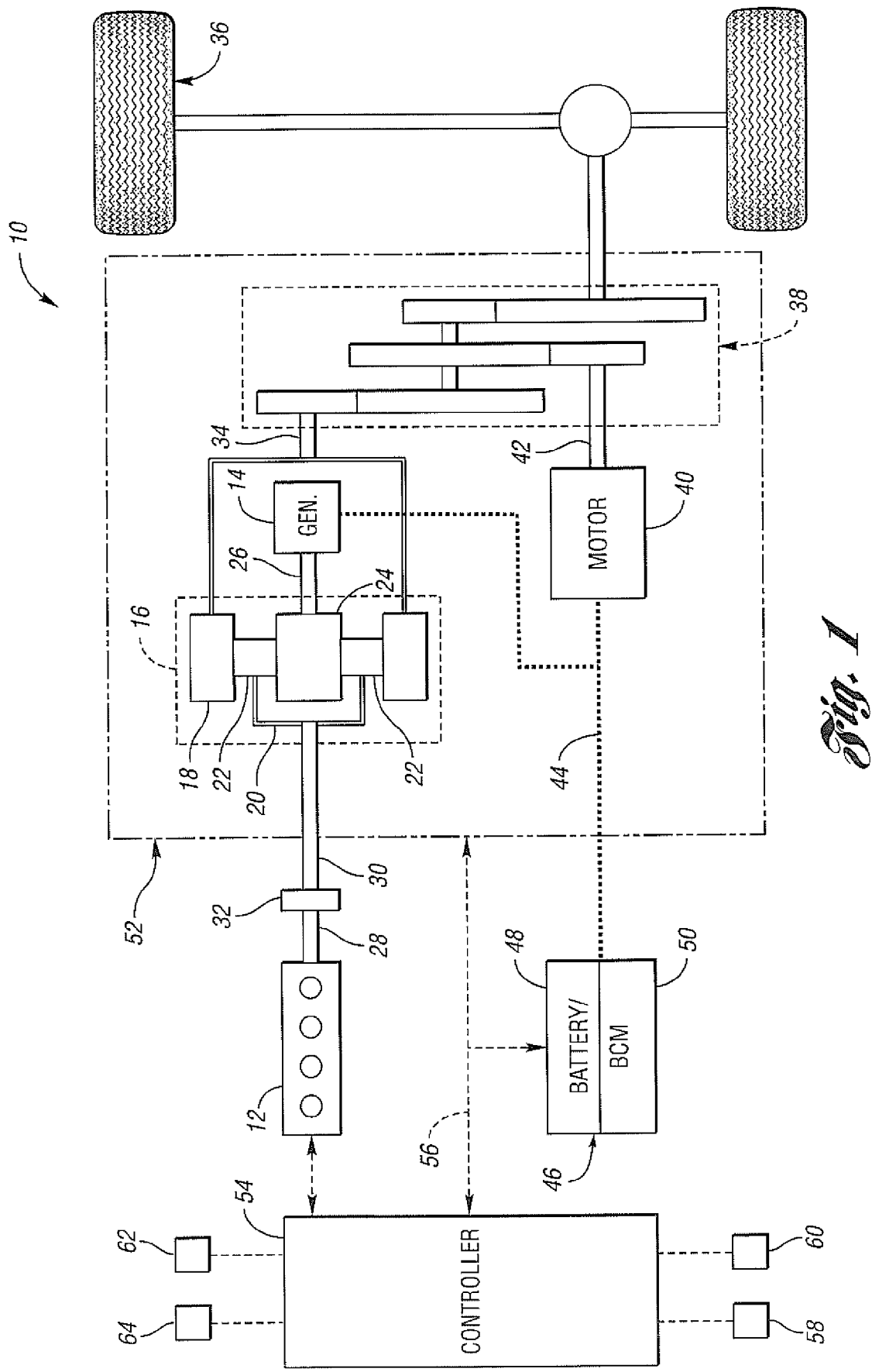
FIG. 1 is a simplified, exemplary schematic representation of a hybrid electric vehicle (HEV) including a display system according to one or more embodiments of the present application.

Referring now to the drawings, FIG. 1 is a simplified, exemplary schematic representation of a vehicle 10, which may include an engine 12 and a first electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. Furthermore, the planetary gear arrangement 16 may include a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16. The ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present disclosure may have different electric machine arrangements, such as more or fewer than two electric machines. In the embodiment shown in FIG. 1, the electric machine arrangement (i.e. the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 may be a high voltage battery capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as controller 54, may be provided. Although it is shown as a single controller, it may include multiple controllers which may be used to control multiple vehicle systems. For example, the controller 54 may be a vehicle system controller/powertrain control module (VSC/PCM).

A controller area network (CAN) 56 can allow the controller 54 to communicate with the transmission 52 and the BCM 50. Just as the battery 48 includes a BCM 50, other devices may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40 through an inverter (not shown), and report operating conditions to the controller 54. Some or all of these various controllers can make up a control system in accordance with the present disclosure.

Although illustrated and described in the context of the vehicle 10, which is a full HEV, it is understood that embodiments of the present disclosure may be implemented on other types of vehicles, such as those including other hybrid systems, those powered by an electronic motor alone, or those powered by an internal combustion engine alone. It is further understood that embodiments of the present disclosure may be implemented on vehicles which incorporate at least one alternative energy recovery and storage device such as a flywheel device, a hydraulic device, or a pneumatic device. Lastly, the present disclosure contemplates that the alternative energy recovery and storage device may, or may not, be integrated with a secondary propulsion machines such as a liquid fueled engine or electric machine.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. One or more embodiments of the present disclosure further contemplate that the braking system 58 may also include a regenerative braking system, wherein braking energy is captured and stored as electrical energy in the battery 48. Of course, it should be noted that a regenerative braking system other than an electrical regenerative braking system may also be included as part of the braking system 58 (e.g., a hydraulic regenerative braking system, mechanical regenerative braking system, or the like). Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 may include a display system 64, which, as explained in greater detail below, may provide information indicative of the driving state of the vehicle 10.

Figure 2:
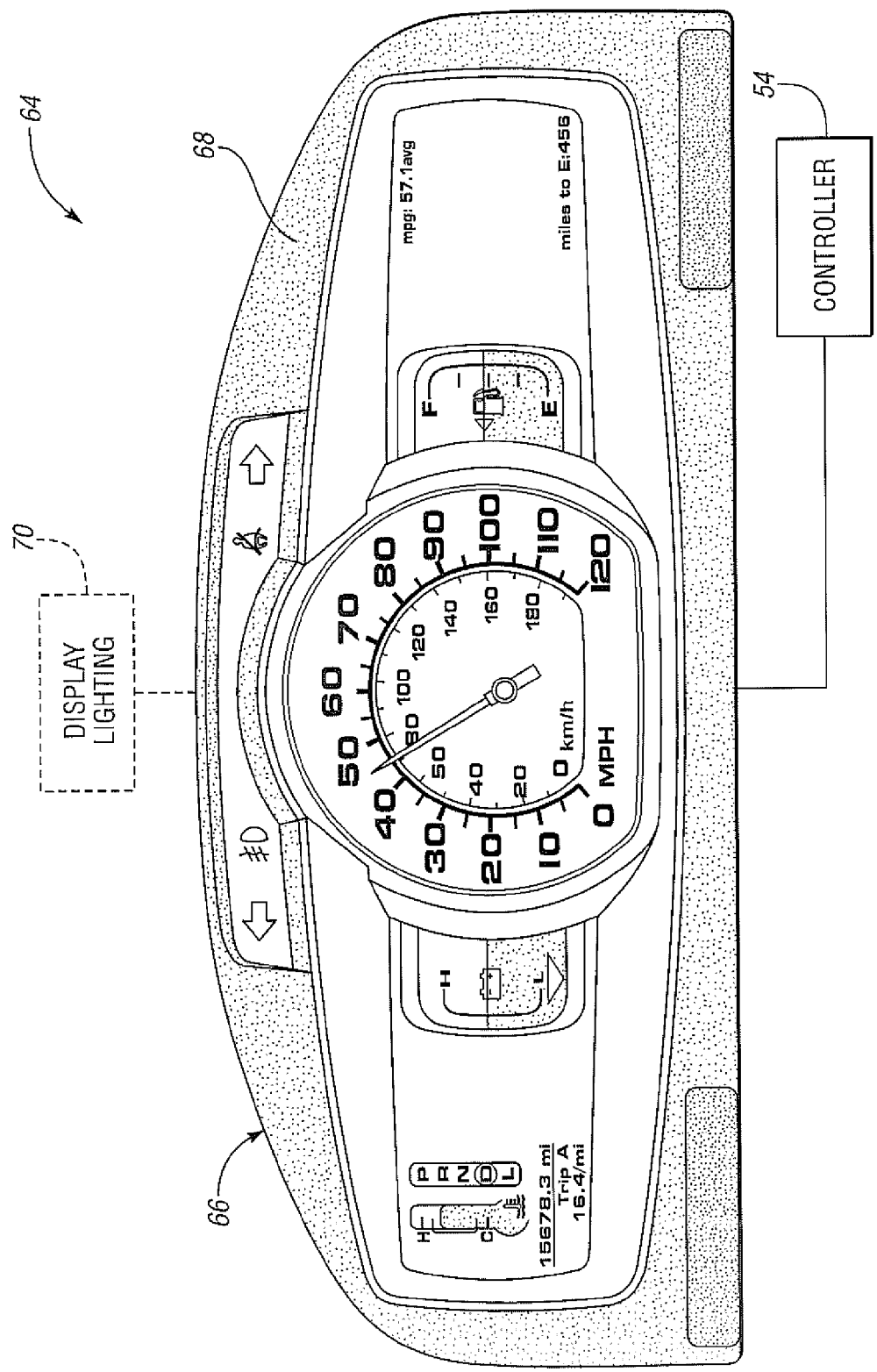
FIG. 2 is simplified, exemplary diagram depicting the display system according to one or more embodiments of the present application.

FIG. 2 shows the display system 64 according to one or more embodiments of the present application in greater detail. The display system 64 may include an information display 66 disposed within a dashboard (not shown) of the vehicle 10. In this regard, the information display 66 may be incorporated within an instrument cluster display 68. It is fully contemplated that the information display 66 may be also be incorporated into a center console display, an overhead display, or any other area within a vehicle suitable for displaying information indicative of vehicle operating states or conditions to an operator of the vehicle 10.

The display system 64 may include electronics, including software, which are not illustrated in FIG. 2. Moreover, the display system 64 may further include a controller, which, for reference purposes, may be the controller 54 described in FIG. 1. The controller 54 may be configured to receive sensed, and/or non-sensed, inputs that relate to current operating conditions of the vehicle 10. Furthermore, the controller 54 may provide outputs to the information display 66 such that the information indicative of vehicle operating states or conditions may be displayed.

The information display 66 may indicate information pertaining to vehicle operating conditions using any number of analog displays and/or gauges. Alternatively, the information display 66 may display information indicative of vehicle operating conditions using any number of digital displays and/or gauges. For example, the information display 66 may display information indicative of vehicle operating conditions using a liquid crystal display (LCD), a plasma display, an organic light emitting display (OLED), or any other display suitable to display vehicle operating conditions. Moreover, the information display 66 may include a combination of both analog and digital displays and/or gauges.

The information display 66 may include display lighting 70 to enhance the visibility and readability of the display content, such as indicators, graphics, images, text or the like. The display lighting 70 may include one or more frontlights or backlights for illuminating all or a portion of the information display 66. A frontlight is a light placed in front of or forward of a display. A backlight, on the other hand, may be used to illuminate a display from the side or back of the display panel. In conventional displays, backlights may be used to illuminate specific analog indicators or gauges corresponding to the indicators. In LCDs, backlights may be used to increase readability in low light conditions and may be used to produce light in a manner similar to a cathode ray tube (CRT) display. In this regard, an LCD backlight may be built into a layer of the LCD screen. Several different types of light sources may be used for the display lighting 70. For example, the display system 64 may employ incandescent light bulbs, light-emitting diodes (LEDs), an electroluminescent panel (ELP), cold cathode fluorescent lamps (CCFL), hot cathode fluorescent lamps, or the like.

The display lighting 70 may be any color or may cause the information display 66 to illuminate in any color. Color, as referenced herein, refers more specifically to a set of color properties. For example, in chromatics, there are three generally recognized properties of color-hue, saturation, and lightness. Hue refers to a color's direction from white, for example, in a color wheel or chromaticity diagram. A hue is often described with names such as "yellow" or "red" and may be referred to as a "pure color." Saturation refers to the perceived intensity of a specific color. Specifically, saturation refers to the difference of a color against its own brightness. Lightness refers to the brightness perception of a color along a lightness-darkness axis or scale (i.e., how light or dark the color is).

There are many other terms that may be used to describe properties of color, but most are similar or related to the three main properties described above. For example, the terms colorfulness, chroma, purity and intensity are all related to saturation although they may refer to distinct concepts about the perceived intensity of a color. Similarly, lightness is sometimes referred to as brightness or value. Terms such as tint and shade relate to lightness, but may also impact saturation and perceived hue. Specifically, a tint is a color made lighter by adding white, while a shade is a color made darker by adding black.

According to one or more embodiments of the present application, the display lighting 70 may change color based at least in part upon a particular vehicle operating condition or state. For instance, in the case of an HEV, the display lighting 70 may illuminate at least a portion of the information display 66 according to a first set of color properties when the vehicle is being propelled using electric power alone (i.e., the engine 12 is off). The operating state of the vehicle 10, when the engine 12 is not being used to propel the vehicle, may be referred to as the electric vehicle (EV) drive mode. Operating the vehicle in the EV mode can improve fuel economy performance and reduce emissions, among other things. Accordingly, the first set of color properties may include a green hue so that the display lighting 70 may illuminate the information display 66 with a generally green color. In this regard, the display lighting 70 can provide a simple and natural indication of the operating state of the vehicle to a driver.

Further, the display lighting 70 may illuminate at least a portion of the information display 66 according to a second set of color properties when the engine is being used to propel the vehicle. The operating state of the vehicle 10, when the engine 12 is being used to propel the vehicle, may be referred to as the engine on drive mode. Operating the vehicle in the engine on drive mode can reduce fuel economy performance and increase emissions, among other things. Accordingly, the second set of color properties may include a red hue so that the display lighting 70 may illuminate the information display 66 with a generally red color.

In accordance with one or more embodiments of the present application, the display lighting 70 may change colors other than when the engine 12 of the vehicle 10 turns on and off. For example, in the EV drive mode, the display lighting 70 may illuminate at least a portion of the information display 66 according to a third set of color properties when an energy storage device, such as the battery, is depleted beyond a predetermined threshold. The battery expends energy when used to propel the vehicle and power other vehicle devices/accessories. When the amount of energy being expended by the battery exceeds the amount of energy being captured (e.g., through regenerative braking), the battery's state of charge is reduced. At some point when the battery is completely depleted or nearly completely depleted, the engine 12 may turn on to help propel the vehicle and recharge the battery. Of course, the engine 12 may turn on for reasons other than the battery state of charge.

In any event, a threshold may be provided which indicates that the battery's state of charge is nearing a point in which the engine will turn, if not already on. In this regard, the third set of color properties may include a yellow hue so that the display lighting 70 may illuminate the information display 66 with a generally yellow color to indicate to the operator that the vehicle may soon enter the engine on drive mode due to a relative lack of battery charge. Of course, it is fully contemplated that at least a portion of the information display 66 may illuminate yellow to indicate to the operator of the vehicle that the engine is near to turning on for a plurality of different reasons (e.g., high speed, acceleration, engine temperature, heater setting, etc.).

It should be noted that color combinations other than those specifically disclosed may be employed in illuminating the information display 66 depending in the operating state of the vehicle. For example, blue lighting may be employed to illuminate the information display 66 when the vehicle is in the EV drive mode and orange lighting may be employed to illuminate the information display 66 when the vehicle is in the engine on drive mode. Thus, the display lighting 70 can provide a simple and natural indication of the operating state of the vehicle to a driver.

The controller 54 may determine the operating state of the vehicle based at least in part upon one or more sensed or non-sensed vehicle inputs, as previously described. The controller communicates the operating state of the vehicle to the information display 66 by transmitting (outputting) an electrical signal to the information display 66, either directly or indirectly, so that the information display 66 illuminates in a color corresponding to the current operating state. For instance, the signal transmitted by the controller may be processed by hardware and/or software using the electronics (not shown) associated with the display system 64. The display electronics may include one or more processors, driver circuits or other components recognized by one of ordinary skill in the art.

Figure 3:
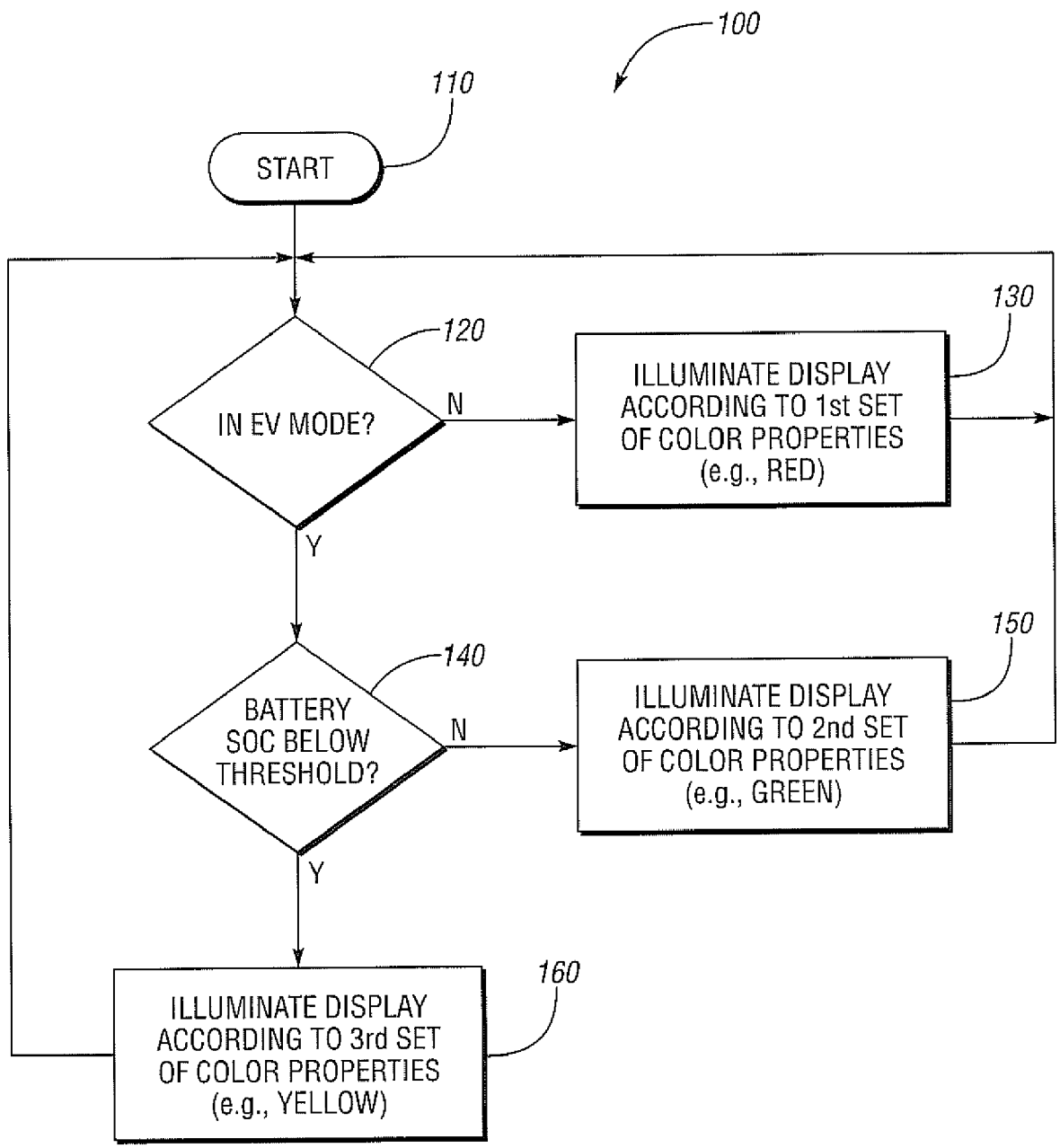
FIG. 3 is a simplified, exemplary flowchart depicting a methodology according to one or more embodiments of the present application.

Referring now to FIG. 3, a simplified, exemplary flowchart depicting a methodology according to one or more embodiments of the present application is illustrated. Step 110 provides an entry to the method. At step 120, the operating state of the vehicle may be determined. For instance, the controller may sense or otherwise determine whether the engine is being used to propel the vehicle. Stated differently, the controller may determine whether the vehicle is in the EV drive mode. If it is determined that the vehicle is not in the EV drive mode, the information display 66 may illuminate according to a first set of color properties, as shown by step 130. For example, if the vehicle is in the engine on drive mode, the display lighting 70 may illuminate the information display 66 in red. If, on the other hand, it is determined that the vehicle is in the EV drive mode, the method may proceed to step 140.

At step 140, it may be determined whether the vehicle is relatively close to entering the engine on drive mode based upon current vehicle operating conditions. As one example, shown in FIG. 3, it may be determined whether the state of charge of the battery is below a predetermined threshold. Of course, at step 140 it may be determined whether any energy storage device has been depleted beyond a predetermined threshold. If it is determined that the energy storage device has not been depleted beyond the predetermined threshold, the information display 66 may illuminate according to a second set of color properties, as shown by step 150. For example, if the battery state of charge is above the predetermined threshold, the display lighting 70 may illuminate the information display 66 in green. On the other hand, if the battery state of charge is below the predetermined threshold, then the information display 66 may illuminate according to a third set of color properties, as shown by step 160. To this end, the display lighting 70 may illuminate the information display 66 in yellow.

After the display lighting has been changed to illuminate the information display in the corresponding color, the method may return to step 120 to continuously update the information display and its associated lighting based upon the current operating state of the vehicle. It should be noted that the method of FIG. 3 as described herein is exemplary only, and that the functions or steps of the method could be undertaken other than in the order described and/or simultaneously as may be desired, permitted and/or possible.

While the best mode for carrying out the invention has been described in detail, those familiar with the art to which this invention relates will recognize various alternative designs and embodiments for practicing the invention as defined by the following claims.

What is claimed:

1. A display system for a vehicle comprising:
an information display having associated display lighting; and
a controller configured to:
determine an operating state of the vehicle; and
transmit a signal indicative of the operating state of the vehicle so that the display lighting illuminates at least a portion of the information display in a color corresponding to the determined operating state, wherein the display lighting illuminates the information display according to at least one of a first set of color properties when an engine is being used to propel the vehicle, a second set of color properties when the engine is not being used to propel the vehicle and a state of charge of an energy storage device is above a predetermined threshold indicative of a state of charge near which the engine will turn on, and a third set of color properties when the engine is not being used to propel the vehicle and the state of charge is below the predetermined threshold.

2. The display system of claim 1, wherein the display lighting includes a backlight for illuminating a background of the information display.

3. The display system of claim 1, wherein the information display is an instrument cluster display.

4. The display system of claim 1, wherein the display lighting includes a frontlight for illuminating the information display.

5. The display system of claim 1, wherein the information display is a center console display.

6. The display system of claim 1, wherein the information display is an overhead display.

7. The display system of claim 1, wherein the vehicle is operating in an electric vehicle (EV) drive mode when the display lighting illuminates the information display according to one of the second set of color properties and the third set of color properties.

8. The display system of claim 7, wherein the energy storage device provides power to at least one electric machine to propel the vehicle in the EV drive mode.

9. The display system of claim 1, wherein the first set of color properties includes a red hue, the second set of color properties includes a green hue and the third set of color properties includes a yellow hue.

10. A method for indicating an operating state of a vehicle comprising:
- determining the operating state of the vehicle from a plurality of operating states; and
- illuminating at least a portion of an information display in a color corresponding to the determined operating state, wherein the information display illuminates in at least one of a first color state when an engine is being used to propel the vehicle, a second color state when the engine is not being used to propel the vehicle and a state of charge of an energy storage device is above a predetermined threshold indicative of a state of charge near which the engine will turn on, and a third color state when the engine is not being used to propel the vehicle and the state of charge is below the predetermined threshold.

11. The method of claim 10, wherein the information display is an instrument cluster display.

12. The method of claim 10, wherein the information display is a center console display.

13. The method of claim 10, wherein the information display is an overhead display.

14. The method of claim 10, wherein the vehicle is operating in an electric vehicle (EV) drive mode when the information display illuminates in one of the second color state and the third color state.

15. The method of claim 14, wherein the energy storage device provides power to at least one electric machine to propel the vehicle in the EV drive mode.

16. A display system for a vehicle including an engine, at least one electric machine and an energy storage device, the engine and the at least one electronic machine operable to provide torque to propel the vehicle and to provide electric power to charge the energy storage device, the energy storage device configured to provide electric power to the at least one electric machine, the information display system comprising:
- an instrument cluster display having a backlight for illuminating a background of the instrument cluster display; and
- a controller in communication with the instrument cluster display configured to:
  - receive input indicative of whether the engine is being used to propel the vehicle;
  - receive input corresponding to a state of charge of the energy storage device;
  - transmit a first signal indicative of an engine on drive mode so that the backlight illuminates the background of the instrument cluster display in a first color when the engine is being used to propel the vehicle;
  - transmit a second signal indicative of an electric vehicle (EV) drive mode so that the backlight illuminates the background of the instrument cluster display in a second color when the engine is not being used to propel the vehicle and the state of charge is above a predetermined threshold, wherein the predetermined threshold is indicative of a state of charge near which the engine will turn on; and
  - transmit a third signal indicative of the EV drive mode so that the backlight illuminates the background of the instrument cluster display in a third color when the engine is not being used to propel the vehicle and the state of charge is below the predetermined threshold.

17. The display system of claim 2, wherein the information display is a liquid crystal display (LCD).

18. The method of claim 10, wherein illuminating at least a portion of the information display includes illuminating a background of the information display using a backlight.

19. The method of claim 18, wherein the information display is a liquid crystal display (LCD).

20. The method of claim 10, wherein illuminating at least a portion of the information display includes illuminating the information display using a frontlight.

* * * * *